M. CARR.
SIDE BEARING FOR TRUCK BOLSTERS.
APPLICATION FILED SEPT. 13, 1907.
907,005. Patented Dec. 15, 1908.
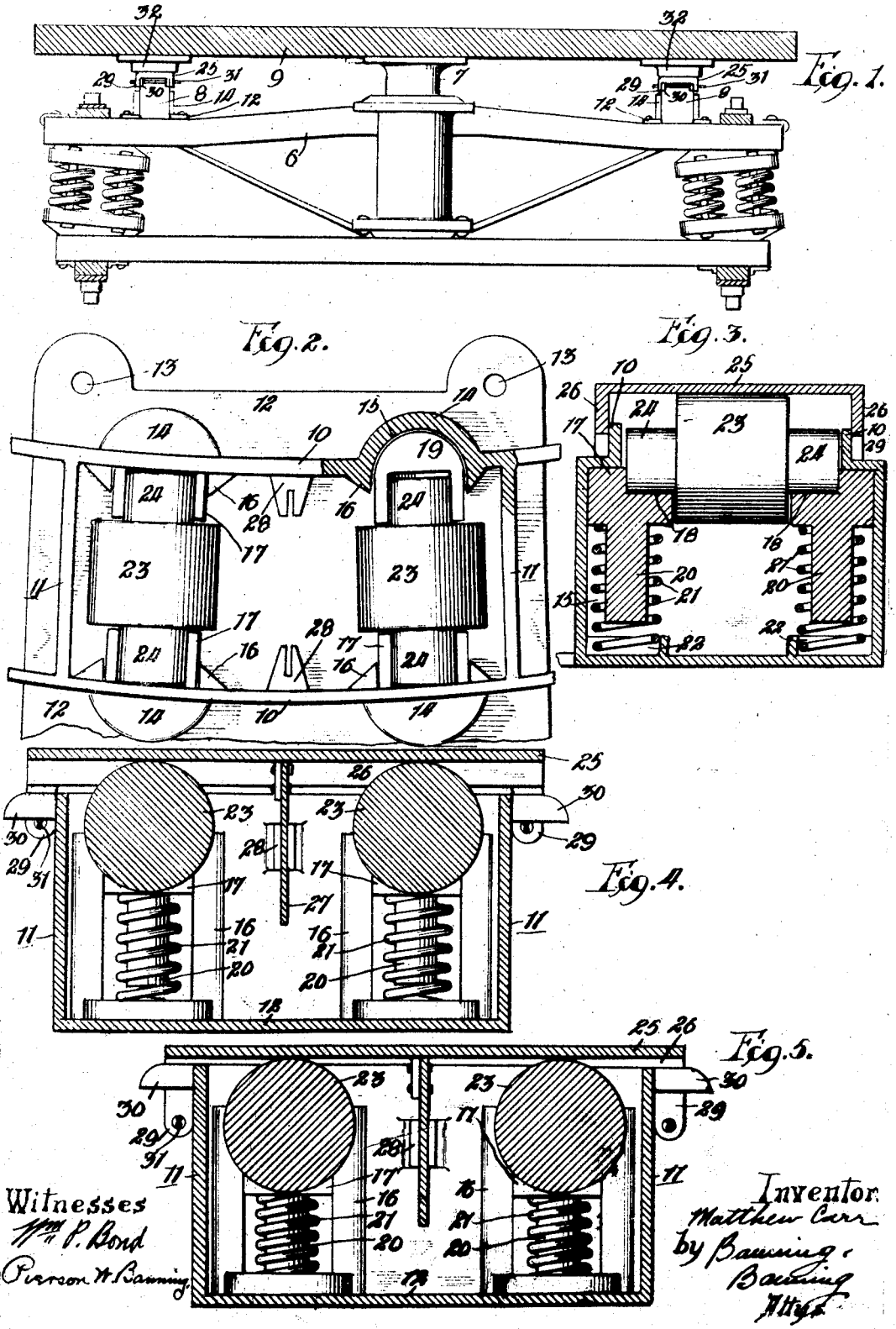

UNITED STATES PATENT OFFICE.

MATTHEW CARR, OF CHICAGO, ILLINOIS, ASSIGNOR OF SIXTY-FIVE ONE-HUNDREDTHS TO JOSEPH C. CARRY, OF CHICAGO, ILLINOIS.

SIDE BEARING FOR TRUCK-BOLSTERS.

No. 907,005.      Specification of Letters Patent.      Patented Dec. 15, 1908.

Application filed September 13, 1907. Serial No. 392,692.

*To all whom it may concern:*

Be it known that I, MATTHEW CARR, a citizen of the United States, residing at Chicago, in the county of Cook and State of Illinois, have invented certain new and useful Improvements in Side Bearings for Truck-Bolsters, of which the following is a specification.

The object of this invention is to provide a side bearing for truck bolsters which will reduce the friction on the bolster occasioned by a turning of the truck as a car is drawn around a curve in the track, and which will provide a spring bearing adapted to maintain a constant contact against the under surface of the car body, whereby excessive side rolling or oscillation of the car will be prevented.

Another object of the invention is to reduce the wearing due to friction, so that the proper balance for the car will always be maintained.

In rigid side bearings of the ordinary style a heavy strain is put on the engine in rounding curves by reason of the excessive friction caused by the swing or turn of the truck, and this is more especially true in the case of heavy modern cars of steel construction, which excessive friction greatly reduces the draft capacity of the engine and necessitates the employment of a smaller number of cars than would be otherwise employed.

The object of the present invention is to obviate the difficulty above noted and enable an engine to draw a greater number of cars than would otherwise be the case.

The invention consists in the features of construction and combination of parts hereinafter described and claimed.

In the drawings Figure 1 is a sectional elevation of a truck bolster, showing the side bearings of the present invention; Fig. 2 an interior plan view of the side bearings, the roller bearing plate being removed; Fig. 3 a cross sectional view of the same; Fig. 4 a longitudinal sectional view of the same in normal position; and Fig. 5 a similar view, showing the springs subjected to the weight of a heavy load.

The side bearing of the present invention is capable of being applied to a truck of any ordinary type having a truck bolster 6 provided with a center bearing 7 of ordinary construction. The side bearings 8 are secured near the outer ends of the truck bolster and are adapted to balance the weight of the car body 9 which rests upon the center bearing.

The side bearing comprises a box having side walls 10 which are preferably curved on the arc of a circle having the center bearing as a center, and the side walls are connected by end walls 11 which gives the whole structure a box-like formation. The bearing box rests upon a bed plate 12 provided with holes 13 for the attachment of the bed plate to the top of the truck bolster. The bearing box is provided near each end with companion outwardly bulged semi-cylindrical socket walls 14, which provide companion spring sockets 15. Each of the spring sockets is supplemented by vertical guide lugs 16 which project inwardly into the interior of the bearing box and form vertical guideways for the reception of spring journal blocks 17 each of which is provided on its inner upper surface with a curved bearing recess 18, and is provided on its outer portion with a rounded semi-cylindrical boss 19 adapted to enter the spring socket.

The journal block has depending therefrom a stud 20 which is encircled by a vertical coil spring 21 the lower end of which enters a recess 22 in the floor of the box, which serves to position the spring and prevent its displacement. Each pair of bearing blocks provides a mounting for a roller 23 provided with journals 24 supported within the curved journal recesses 18 in the bearing blocks. The two rollers serve to support a movable bearing plate 25 having curved depending side flanges 26 which overhang the upper edges of the box. The movable bearing plate is provided in its center with a depending flat spring 27 the side edges of which are held between inwardly extending lugs 28 on the side walls of the box, which arrangement permits the movable bearing plate to travel back and forth over the rollers against the tension of the spring a sufficient distance to accommodate the movement of the car trucks with respect to the car body. In order to prevent displacement of the movable bearing plate the latter is provided at its ends with depending ears 29 which coöperate with outwardly extending tongues 30 on the box. The ears 29 are of sufficient length to extend below the lower edge of the tongues 30 and through the ears are entered cotter pins 31 which are of sufficient length to extend across the box beneath the tongues 30, which arrangement serves to lock the parts together and at the same time permits the necessary freedom of movement. The movable bearing plate coöperates with a fixed bearing plate 32 on the under surface of the car body.

In use, when the car is light, the fixed bearing plates will rest in easy contact with the movable bearing plates, and the springs within the bearing boxes will not be compressed to any great extent, and the rollers will be raised to their limit. When the car is loaded the rollers will be depressed and the springs compressed to sustain the increased load. During the transit of the car the car body will be balanced by the action of the springs, which serve to prevent excessive side rolling or vibration since any tendency toward rolling will be counteracted by the increased compression of the springs on the side of the truck toward which the car body tends to roll. When rounding a curve the turn of the trucks will cause the movable bearing plate, which is in frictional contact with the fixed bearing plate, to roll along the rollers a sufficient distance to accommodate the turn of the trucks, and this rolling will minimize the friction to such an extent that the engine will be relieved from excessive strain and enabled to haul a much heavier load than would be the case in drawing around a curve heavily loaded cars having frictional side bearings of ordinary construction.

What I claim as new and desire to secure by Letters Patent is:

1. In a side bearing, the combination of a bearing box, a roller within the bearing box provided with outwardly extending journals, journal blocks upon which the journals are mounted, springs supporting the journal blocks, a movable bearing plate mounted upon the roller, and a spring secured to the bearing plate and adapted to return the same to normal position, substantially as described.

2. In a side bearing, the combination of a box, a pair of rollers mounted within the box and upwardly projecting therefrom, slidably mounted bearing blocks within which the rollers are journaled, coil springs within the box upon which the journal blocks are supported, a movable bearing plate resting upon the rollers, and a flat spring depending from the movable bearing plate and engaging with the walls of the box for returning the bearing plate to normal position, substantially as described.

3. In a side bearing, the combination of a box provided on its sides with two pair of guideways, journal blocks slidably mounted within the guideways and provided with depending studs, coil springs encircling the studs and adapted to support the journal blocks, rollers journaled within the journal blocks, and a movable bearing plate resting upon the rollers and provided with depending side flanges overhanging the upper side edges of the box, substantially as described.

4. In a side bearing, the combination of a box provided with guideways, a pair of rollers mounted within the box, a pair of bearing blocks for each roller, located on opposite sides of said roller and each comprising an enlarged head slidably mounted within the adjacent guideway and provided in its upper face with a recess and a stud depending from said head, journals outwardly extending from the rollers and entered within said recesses, a coil spring surrounding each of the studs, a movable bearing plate resting upon the rollers, stops for limiting the movement of the bearing plate, and a spring connected with the bearing plate for returning it to normal position, substantially as described.

MATTHEW CARR.

Witnesses:
WALKER BANNING,
PIERSON W. BANNING.